(No Model.)
J. N. KAILOR & E. L. WILLIAMS.
RAKE MECHANISM FOR CLOVER HULLERS.
No. 473,701. Patented Apr. 26, 1892.
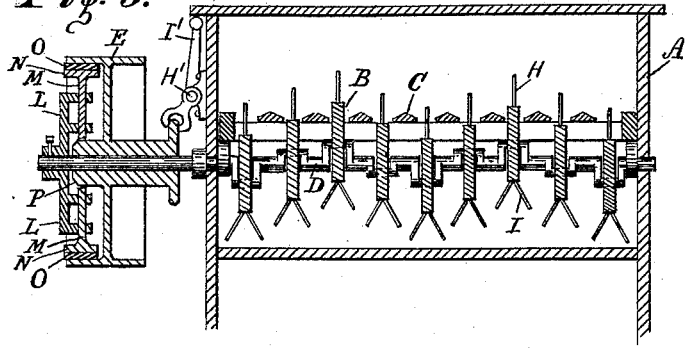
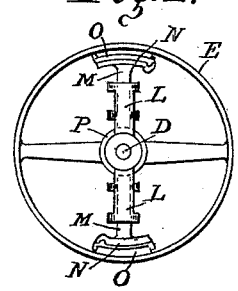
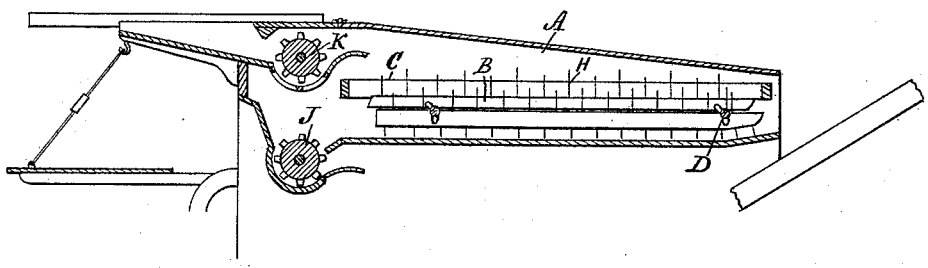
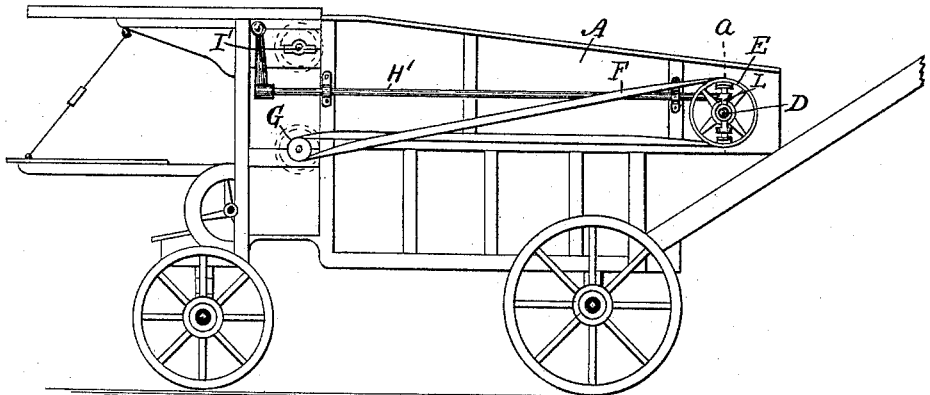
WITNESSES:
V. M. Hood.
John F. Mains
INVENTORS:
John N. Kailor
Elmer L. Williams
BY
H. P. Hood,
ATTORNEY.

UNITED STATES PATENT OFFICE.

JOHN N. KAILOR AND ELMER L. WILLIAMS, OF COLUMBUS, INDIANA, ASSIGNORS TO REEVES & CO., OF SAME PLACE.

RAKE MECHANISM FOR CLOVER-HULLERS.

SPECIFICATION forming part of Letters Patent No. 473,701, dated April 26, 1892.

Application filed November 13, 1891. Serial No. 411,774. (No model.)

*To all whom it may concern:*

Be it known that we, JOHN N. KAILOR and ELMER L. WILLIAMS, citizens of the United States, residing at Columbus, in the county of Bartholomew and State of Indiana, have invented a new and useful Improvement in Rake Mechanism for Clover-Hullers, of which the following is a specification.

Our invention relates to an improvement in mechanism for operating the rakes or equivalent mechanism which receives the stems and chaff from the stemming-cylinder in that class of clover-hulling machines in which two operating-cylinders are used.

The object of our improvement is to stop the movement of the rake or other like separating mechanism while the cylinders are still in motion, so as to prevent the feeding of material which has passed the upper cylinder from reaching the lower cylinder.

The accompanying drawings illustrate our invention.

Figure 1 represents a side elevation of a clover-hulling machine having our improvement. Fig. 2 represents a longitudinal section of the same. Fig. 3 represents a vertical transverse section at *a*, Fig. 1, on a larger scale. Fig. 4 represents a side elevation of the clutching mechanism.

In the drawings, A represents the casing, in which the rake-bars B and the rake-bed C are mounted.

D is a multiple-crank shaft extending across the main casing and having its cranks connected with the rakes, so as to impart to the same a vibratory motion, and having, also, near its ends cams, on which the rake-bed rests, all in the usual well-known manner.

E is a band-wheel mounted on shaft D and connected by a belt F with a pulley G, mounted on the shaft of the hulling-cylinder, the arrangement being such that the band-wheel E revolves continuously while the hulling-cylinder is running.

The rake is of the usual well-known form, having teeth H on its upper side, which force the stalks, which are passed through the upper cylinder K, along the bars of the rake-bed toward the rear of the machine, and teeth I on its lower side, which force the unthrashed seed-pods, chaff, and other matter which fall through the rake-bars, in the opposite direction, or toward the lower cylinder J.

Heretofore the band-wheel E has been rigidly secured to the shaft D, so that the shaft revolves and the rake continues in operation at all times when the thrashing and hulling cylinders are running.

It is desirable in stopping the machine to prevent the material which has passed the upper cylinder from being carried forward to the lower cylinder when the speed of the lower cylinder has been reduced, so that it will not clear itself. To accomplish this, we mount the drive-wheel E on the shaft so as to turn loosely thereon and secure to the shaft a clutch adapted to engage the band-wheel at the will of the operator, said clutch being controlled and operated by means of a rod H', extending along the side of the machine, and a lever I', arranged within convenient reach of the person feeding the machine. Said clutch may be of any suitable construction; but we prefer that illustrated in Figs. 3 and 4, in which L L represent a pair of arms, which are rigidly secured to the shaft D. Each of the arms L is provided with a bar M, terminating in a shoe N and arranged to slide longitudinally along the arm. The outer faces of the shoe N are provided with a hinged friction-plate O, which engages the inner surface of the rim of wheel E. The outer end of the hub of wheel E is tapered, as at P, and the wheel is arranged to be shifted longitudinally along the shaft D by means of the rod H' and lever I'. The inner ends of the bars M are arranged to just clear the smaller diameter of the hub of wheel E. In operation the friction-plates O are normally clear of the rim of wheel E, but are forced upward against the rim by forcing the tapered end of the hub of the wheel between the ends of bars N, and thus causing the shaft to turn with the wheel. In stopping the machine the hub is first withdrawn from between the bars, thus stopping the mechanism which feeds the material to the lower cylinder, so that when said cylinder stops its concave is perfectly clear.

We claim as our invention—

In a clover-hulling machine having two cylinders for operating on the clover, said cylinders being arranged one above the other, the combination of the upper cylinder, the lower cylinder, the open rake-bed arranged to receive the material after it passes the upper cylinder, the rake-bars arranged in the interstices of the rake-bed and provided with teeth on their upper and their under sufaces, the multiple-crank shaft on which said rake-bars are mounted, the loose pulley mounted on said shaft, the belt connecting said loose pulley with the lower cylinder so as to revolve therewith, the clutch mounted on the crank-shaft so as to revolve therewith and adapted to engage the loose pulley, and the lever arranged to throw the pulley into and out of engagement with the clutch, all arranged to co-operate in the manner and for the purpose set forth.

JOHN N. KAILOR.
ELMER L. WILLIAMS.

Witnesses:
B. M. HUTCHINS,
H. P. HOOD.